United States Patent [19]

Jipson et al.

[11] Patent Number: 4,760,565

[45] Date of Patent: Jul. 26, 1988

[54] HIGH SPEED TRACK ACCESS FOR OPTICAL DISKS USING ACOUSTO-OPTIC DEFLECTOR

[75] Inventors: Victor B. Jipson, San Jose; Daniel Rugar, Palo Alto, both of Calif.

[73] Assignee: International Business Machines Corporation, Armonk, N.Y.

[21] Appl. No.: 906,862

[22] Filed: Sep. 15, 1986

[51] Int. Cl.⁴ .................. G11B 7/085; G02F 1/33
[52] U.S. Cl. ........................ 369/44; 350/358; 369/45; 369/109
[58] Field of Search ............ 365/234; 369/44, 45, 369/46, 100, 109, 119; 350/358

[56] References Cited

U.S. PATENT DOCUMENTS

| | | | |
|---|---|---|---|
| 3,924,063 | 12/1975 | Simons | 369/44 |
| 3,962,688 | 6/1976 | Westerberg | 365/234 |
| 4,094,010 | 6/1978 | Pepperl et al. | 369/44 |
| 4,094,013 | 6/1978 | Hill et al. | 369/44 |
| 4,236,232 | 11/1980 | Jansen et al. | 365/234 |
| 4,298,974 | 11/1981 | Tsunoda et al. | 369/122 |
| 4,449,212 | 5/1984 | Reno | 369/112 |
| 4,525,824 | 6/1985 | Hatano et al. | 369/45 |
| 4,550,249 | 10/1985 | Damen et al. | 369/44 |
| 4,656,618 | 4/1987 | Kaku et al. | 369/44 |

*Primary Examiner*—William H. Beha, Jr.
*Attorney, Agent, or Firm*—Joseph G. Walsh

[57] ABSTRACT

A process for accessing disk tracks in an optical storage disk using a laser beam passed through an acousto-optic deflector which generates an undeflected beam and at least one deflected beam both of which are focussed on the surface of the disk. The deflected beam is used to read or write data and the undeflected beam is used to follow a servoing structure on the disk.

4 Claims, 2 Drawing Sheets

1
HIGH SPEED TRACK ACCESS FOR OPTICAL DISKS USING ACOUSTO-OPTIC DEFLECTOR

DESCRIPTION

1. Technical Field

The present invention is concerned with high speed track access for optical disks using an acousto-optic deflector.

2. Background Art

In most current configurations of optical disk systems, a mechanical actuator moving a lens is used to access individual tracks on a disk. This actuator is relatively slow, limiting the track access time to the millisecond range. Since track access time is a major factor in the performance of a disk system, the introduction of a non-mechanical means to access tracks wouldbe highly desirable. The slowness of the current mechanical actuators also limits the gain and bandwidth of the track servo system.

To guide the position of the lens actuator, most current schemes require grooves to be fabricated on the disk for each data track. These grooves are a major source of noise on optical disks and require stringent production control.

U.S. Pat. No. 4,236,232 discloses the use of a deflection element to speed up the accessing of a track on an optical disk. The second reference signal represents the radial position of the desired track.

U.S. Pat. No. 3,962,688 discloses an optical disk that uses acousto-optical modulation to provide fine adjustment of the laser beam in the radial direction, while coarse adjustment still takes place mechanically.

U.S. Pat. No. 4,550,249 discloses an optical disk read/write apparatus with fast access of individual tracks. Instead of the head moving, mirrors move and deflect the beam to the correct track on the disk.

DISCLOSURE OF THE INVENTION

According to the present invention, a laser beam passes through an acousto-optic deflector (Bragg cell) which generates an undeflected (zero order) beam and at least one deflected (first order) beam. The deflection angle of the first order beam is controlled by the acoustic excitation frequency. Both beams pass through a beam splitter and focusing lens. The two beams are focused onto the surface of the disk and the focal spots are separated by the distance $\Delta x = f\theta$, where f is the lens focal length and $\theta$ is the Bragg deflection angle. The first order beam is used to write or read data on the disk, while the zero order beam follows a reference groove (or other servoing structure) on the disk. A mechanical actuator is used to keep the zero order beam nominally centered ove the reference groove.

By choosing the appropriate Bragg cell excitation frequency, individual tracks within a band of tracks can be accessed by the first order beam. The number of tracks within a band is determined by the characteristics of the acousto-optic deflector. For commonly available Bragg cells the number of resolvable tracks is between 50 and 500. The access time for tracks within a band is set by acoustic propagation delay and is on the order of 10–100 microseconds for reasonable Bragg cells.

Understanding of the invention will be facilitated by reference to the accompanying drawings.

Figure 1:
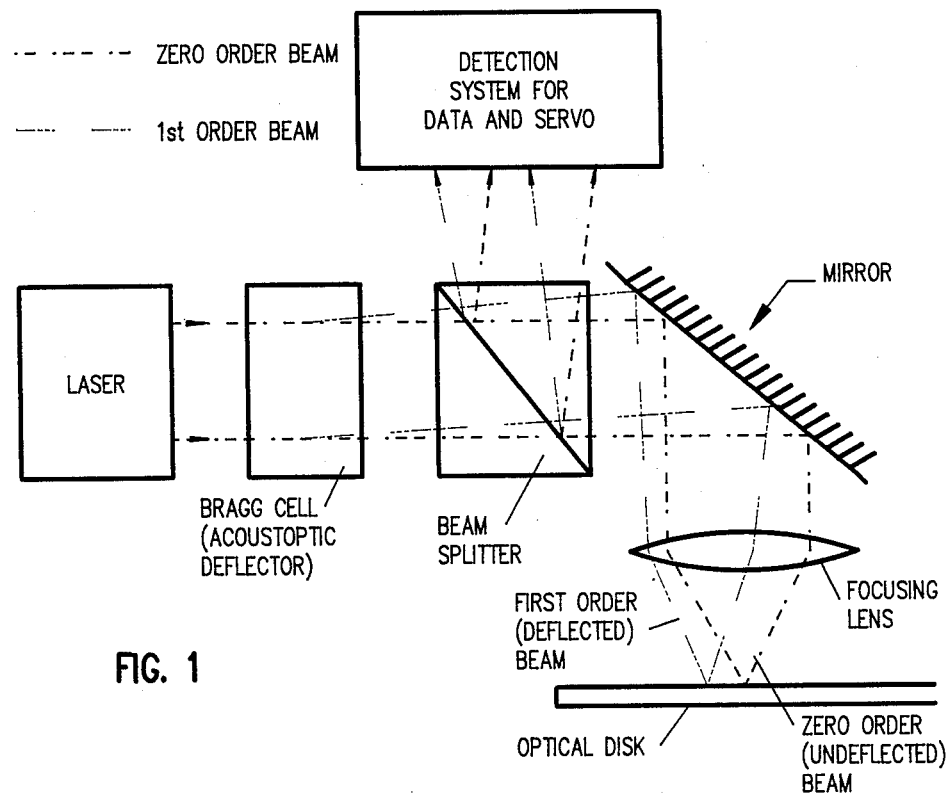
FIG. 1 is a diagram (not to scale) showing an acousto-optical deflector and rays for deflected and undeflected beams.
Figure 2:
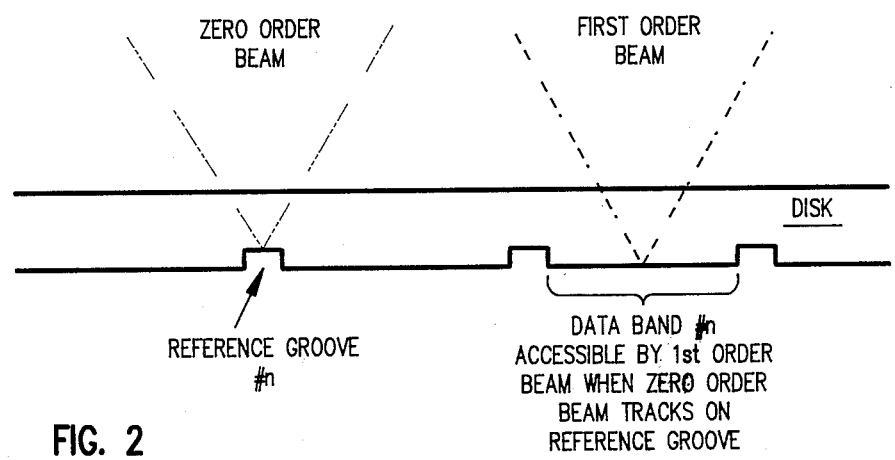
FIG. 2 is a diagram (not to scale) showing the reference grooves and associated data band in an optical storage disk.
Figure 3:
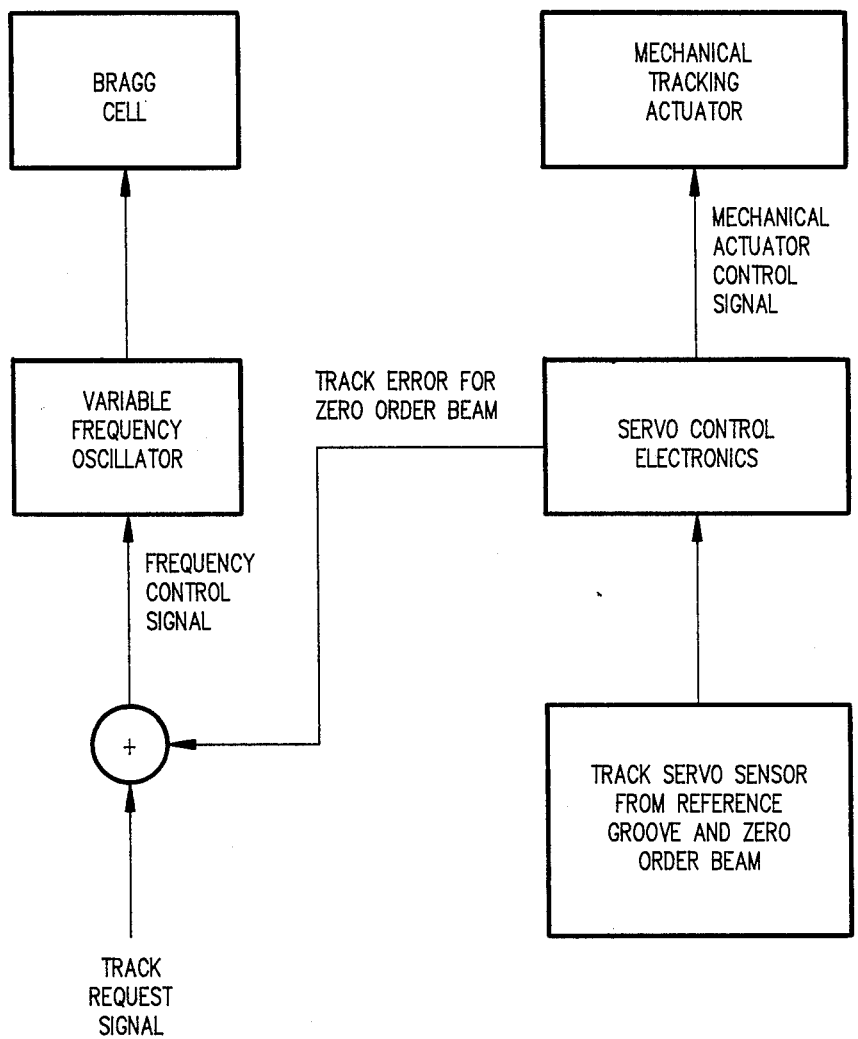
FIG. 3 shows a block diagram of a typical control system. The Bragg cell is driven by an oscillator whose frequency is determined by: (a) the desired track location and (b) the instantaneous track error signal (derived from the position of the zero order beam relative to the reference groove).

The box shown at the top of FIG. 1 which is labelled "DETECTION SYSTEM FOR DATA AND SERVO" represents a system which is well known in the prior art. The system serves to detect focus error signal of the undeflected beam. This is a standard function in any optical disk system and may be accomplished using, for example, the knife edge or astigmatic methods discussed in Chapter 2 of PRINCIPLES OF OPTICAL DISK SYSTEMS by G. Bouwhuis et al, published by adam Hilger Ltd, 1985. The system also serves to detect track error signal of the underflected beam, a standard function in optical disk systems which is accomplished using, for example, the radial push-pull method (see Pages 72 and 73 of the above reference). In addition, the system also performs the standard optical disk function of detecting data signal from the deflected beam. This can be accomplished, for example by measuring beam intensity, as in phase change recording, or Kerr rotation, as in magneto-optic recording. The above reference in Chapter 2 provides a general discussion of these functions. In the case of magneto-optic signal detection, this is discussed in "Digital Magneto-Optic Disk Drive", by T. Deguchi et al, APPLIED OPTICS, Vol. 23, pp. 3972-8, 1984.

Using the track error signal to correct the position of the first order beam effectively increases the closed loop gain of the track servo system and significantly extends its frequency response. This has several implications: (1) lower performance (and lower cost) mechanical tracking systems are possible, since residual error is removed by the acousto-optic system; (2) Higher linear velocities (allowing higher data rate) can be accommodated due to the higher effective servo bandwidth; (3) More accurate tracking is achieved, making possible higher track density. This last feature is desirable when short wavelength, high numerical aperture optics are implemented.

One very attractive feature of the present invention is the fact that data are stored on ungrooved areas of the disk. This means that groove noise does not exist. On present magneto-optic media and at present data densities, elimination of this source of noise makes shot noise limited performance possible and increases the achievable signal-to-noise ratio by 3–6 dB. Depending on how the groove noise scales with optical spot size, even greater signal-to-noise ratio advantage can be achieved at higher data density.

Another attractive consequence of the present invention concerns the fabrication of the grooves. Since data are not stored on the grooved regions, the quality of the reference groove can be relaxed, allowing cheaper, higher yield production.

We claim:

1. A process for accessing disk tracks in an optical storage disk, said process being characterized by the steps of:
   (1) passing a laser beam through an acousto-optic deflector which generates an undeflected beam and at least one deflected beam;
   (2) focusing the undeflected beam and at least one deflected beam onto the surface of the disk;
   (3) using at least one deflected beam to write or read data and;
   (4) using the undeflected beam to follow a servoing structure on the disk.

2. A process as claimed in claim 1 wherein there is a single deflected beam.

3. A process as claimed in claim 1 in which the deflected beam angle is variable.

4. A process as claimed in claim 1 wherein the servoing structure comprises reference grooves separated by ungrooved data recording areas.

* * * * *